United States Patent
Park

(10) Patent No.: US 12,555,566 B2
(45) Date of Patent: Feb. 17, 2026

(54) METHOD FOR TRAINING MACHINE READING COMPREHENSION MODEL, COMPUTER-READABLE RECORDING MEDIUM AND QUESTION ANSWERING SYSTEM

(71) Applicants: HYUNDAI MOTOR COMPANY, Seoul (KR); KIA CORPORATION, Seoul (KR)

(72) Inventor: Cheoneum Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 291 days.

(21) Appl. No.: 18/204,585

(22) Filed: Jun. 1, 2023

(65) Prior Publication Data

US 2024/0096311 A1 Mar. 21, 2024

(51) Int. Cl.
*G10L 15/00* (2013.01)
*G10L 15/02* (2006.01)
(Continued)

(52) U.S. Cl.
CPC ............ *G10L 15/063* (2013.01); *G10L 15/02* (2013.01); *G10L 15/1815* (2013.01);
(Continued)

(58) Field of Classification Search
CPC .... G06F 40/211; G06F 40/268; G06F 40/284; G06F 40/30; G10L 15/07; G10L 15/20; G10L 15/22; G10L 15/26; G10L 15/02; G10L 15/063; G10L 15/08; G10L 25/27; G10L 25/78; G10L 25/87; G10L 25/30;
(Continued)

(56) References Cited

U.S. PATENT DOCUMENTS 10,360,601 B1   7/2019  Adegan
11,366,969 B2 *  6/2022  Rajani ................... G06N 3/045
(Continued)

FOREIGN PATENT DOCUMENTS

KR    10-2088357 B1    3/2020

OTHER PUBLICATIONS

Squad 2.0 "The Stanford Question Answering Dataset"—May 11, 2023 https://rajpurkar.github.io/SQuAD-explorer/.
(Continued)

*Primary Examiner* — Vu B Hang
(74) *Attorney, Agent, or Firm* — Morgan, Lewis & Bockius LLP

(57) ABSTRACT

The disclosure relates to a method for training a machine reading comprehension model, a computer-readable recording medium storing the method, and a question answering system using a trained machine reading comprehension model.

The method for training a machine reading comprehension model includes: obtaining features of input sentences; generating an input sequence including a plurality of tokens based on at least one feature among the obtained features; embedding the input sequence using a pre-trained language model; inputting an output embedding, obtained by embedding the input sequence, to a first encoding layer to perform word-level encoding; and inputting a portion of hidden states of the first encoding layer to a second encoding layer to perform sentence-level encoding.

26 Claims, 18 Drawing Sheets

(51) Int. Cl.
   *G10L 15/06* (2013.01)
   *G10L 15/18* (2013.01)
   *G10L 15/183* (2013.01)
   *G10L 15/22* (2006.01)
   *G10L 15/30* (2013.01)

(52) U.S. Cl.
   CPC ............ *G10L 15/183* (2013.01); *G10L 15/22* (2013.01); *G10L 2015/027* (2013.01); *G10L 15/30* (2013.01)

(58) Field of Classification Search
   CPC ....... G10L 15/16; G10L 19/005; G10L 19/00; G10L 15/1822; G10L 15/183; G10L 15/193; G10L 15/19; G10L 15/12; G10L 15/187; G10L 15/065; G10L 2015/1815
   See application file for complete search history.

(56) References Cited

U.S. PATENT DOCUMENTS

| | | | |
|---|---|---|---|
| 11,449,556 B2* | 9/2022 | Jawagal | G06F 40/284 |
| 11,580,100 B2* | 2/2023 | Shahriar | G06F 16/24522 |
| 11,625,573 B2* | 4/2023 | Gliozzo | G06N 3/045 |
| | | | 706/15 |
| 11,915,828 B2* | 2/2024 | Lindvall | G16H 50/30 |
| 2002/0184178 A1 | 12/2002 | Tasooji et al. | |
| 2015/0170653 A1 | 6/2015 | Berndt et al. | |
| 2017/0336802 A1 | 11/2017 | Lin et al. | |
| 2018/0288182 A1 | 10/2018 | Tong et al. | |
| 2021/0023945 A1 | 1/2021 | Xie et al. | |
| 2021/0081863 A1 | 3/2021 | Gonzalez et al. | |

OTHER PUBLICATIONS

Lim et al. KorQuAD1.0: "Korean QA Dataset for Machine Reading Comprehension"—Sep. 16, 2019.

Trischler et al. "A Parallel-Hierarchical Model for Machine Comprehension on Sparse Data"—Mar. 29, 2016 https://doi.org/10.48550/arXiv.1603.08884.

Xu et al. "Multi-task Learning with Sample Re-weightingfor Machine Reading Comprehension"—Sep. 18, 2018.

* cited by examiner

FIG. 6

| INPUT SENTENCE | ANJEONBELTEUGA PPAJIJI ANHNEUNDE EOTTEOHGE HAEYA HAJI? |
|---|---|
| MORPHEME ANALYSIS RESULT | ANJEON, BELTEU, GA, PPAJI, JI, ANH, NEUNDE, EOTTEOHGE, HA, AYA, HA, JI |
| POS-TAGGING ANALYSIS RESULT | NNG, NNG, JKS, VV, EC, VX, EC, MAG, VV, EC, CX, EF |
| NAMED-ENTITY RECOGNITION RESULT | B-SAFETY_BELT:ST, I-SAFETY_BELT:ST, O, O, O, O, O, O, O, O, O, O |
| SYLLABLE-UNIT SEPARATION RESULT | AN, JEON, BEL, TEU, GA, PPA, JI, JI, ANH, NEUN, DE, EO, TTEOH, GE, HAE, YA, HA, JI |

METHOD FOR TRAINING MACHINE READING COMPREHENSION MODEL, COMPUTER-READABLE RECORDING MEDIUM AND QUESTION ANSWERING SYSTEM

CROSS-REFERENCE TO RELATED APPLICATION

This application is based on and claims the benefit of priority to Korean Patent Application No. 10-2022-0115267, filed on Sep. 14, 2022 in the Korean Intellectual Property Office, the disclosure of which is incorporated herein by reference.

TECHNICAL FIELD

The disclosure relates to a method for training a machine reading comprehension model that searches for an answer span to a user's question, a computer-readable recording medium storing the method, and a question answering system using a trained machine reading comprehension model.

BACKGROUND

A question answering system is a system capable of identifying an intention of a user's question input as natural language and providing an answer to the user's question. The user's question may be input as user's utterance or as text.

When a user's question relates to a function of or how to use a specific device, an answer may be found in a manual describing the function of or how to use the corresponding device. When a user's question relates to common knowledge, an answer may be found in a dictionary, news, and the like.

That is, an answer span is required to be extracted from text-based documents in order to find an answer to a user's question, and in this instance, a machine reading comprehension technology may be used.

SUMMARY

An aspect of the disclosure provides a method for training a machine reading comprehension model for efficiently searching documents for an answer to a user's question using a machine reading comprehension technology, when a user's utterance includes a question, a computer-readable recording medium storing the method, and a question answering system using a trained machine reading comprehension model.

Additional aspects of the disclosure will be set forth in part in the description which follows and, in part, will be obvious from the description, or may be learned by practice of the disclosure.

According to an aspect of the disclosure, there is provided a method for training a machine reading comprehension model, the method including: obtaining features of input sentences; generating an input sequence including a plurality of tokens based on at least one feature among the obtained features; embedding the input sequence using a pre-trained language model; inputting an output embedding, obtained by embedding the input sequence, to a first encoding layer to perform word-level encoding; and inputting a portion of hidden states of the first encoding layer to a second encoding layer to perform sentence-level encoding.

The input sentences include a question sentence and sentences included in a passage including an answer span to the question sentence.

An output of the first encoding layer includes information about a starting position and an ending position of the answer span among the input sentences.

An output of the second encoding layer includes information about a position of a sentence including the answer span among the input sentences.

The method further includes: calculating a first loss value for the starting position of the answer span and a second loss value for the ending position of the answer span; and calculating a third loss value for the position of the sentence including the answer span.

The method further includes adjusting weights of the first encoding layer, the second encoding layer, and the pre-trained language model based on the first loss value, the second loss value and the third loss value.

The embedding includes concatenating at least one feature of the features of the input sentences to the output embedding output from the pre-trained language model.

A hidden state for tokens distinguishing the input sentences among the hidden states of the first encoding layer is input to the second encoding layer.

The at least one feature concatenated to the output embedding includes at least one of a category classification result or a syllable separation result of the input sentences.

The embedding includes generating an input embedding input to the pre-trained language model by summing a token embedding, a segment embedding and a position embedding for the input sequence.

According to an aspect of the disclosure, there is provided a computer-readable recording medium storing a program for implementing a method for training a machine reading comprehension model, the method including: generating an input sequence including a plurality of tokens based on at least one feature among features of input sentences; embedding the input sequence using a pre-trained language model; inputting an output embedding, obtained by embedding the input sequence, to a first encoding layer to perform word-level encoding; and inputting a portion of hidden states of the first encoding layer to a second encoding layer to perform sentence-level encoding.

The input sentences include a question sentence and sentences included in a passage including an answer span to the question sentence.

An output of the first encoding layer includes information about a starting position and an ending position of the answer span among the input sentences.

An output of the second encoding layer includes information about a position of a sentence including the answer span among the input sentences.

The method further includes: calculating a first loss value for the starting position of the answer span and a second loss value for the ending position of the answer span; and calculating a third loss value for the position of the sentence including the answer span.

The method further includes adjusting weights of the first encoding layer, the second encoding layer, and the pre-trained language model based on the first loss value, the second loss value and the third loss value.

The embedding includes concatenating at least one feature of the features of the input sentences to the output embedding output from the pre-trained language model.

A hidden state for tokens distinguishing the input sentences among the hidden states of the first encoding layer is input to the second encoding layer.

The at least one feature concatenated to the output embedding includes at least one of a category classification result or a syllable separation result of the input sentences.

The embedding includes generating an input embedding input to the pre-trained language model by summing a token embedding, a segment embedding and a position embedding for the input sequence.

According to an aspect of the disclosure, there is provided a question answering system, including: a communication module configured to receive a question sentence of a user; and a question answering module configured to search for an answer span to the question sentence using a trained machine reading comprehension model; wherein the trained machine reading comprehension model includes: an embedding layer configured to embed an input sequence corresponding to the question sentence using a pre-trained language model; a first encoding layer configured to perform word-level encoding on an output embedding obtained by embedding the input sequence; and a second encoding layer configured to perform sentence-level encoding on a portion of hidden states of the first encoding layer.

The question answering module is configured to generate the input sequence by preprocessing the question sentence and input sentences including sentences of a passage related to the question sentence.

An output of the first encoding layer includes information about a starting position and an ending position of the answer span to the question sentence among the input sentences.

An output of the second encoding layer includes information about a position of a sentence including the answer span among the input sentences.

At least one feature of the features of the input sentences is concatenated to the output embedding and is input to the first encoding layer.

A hidden state for tokens distinguishing the input sentences among the hidden states of the first encoding layer is input to the second encoding layer.

The at least one feature concatenated to the output embedding includes at least one of a category classification result or a syllable separation result of the input sentences.

The question answering module is configured to generate an input embedding input to the pre-trained language model by summing a token embedding, a segment embedding and a position embedding for the input sequence.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 6 is a table illustrating an example of a feature extraction result of an apparatus for training a machine reading comprehension model according to an embodiment;

DETAILED DESCRIPTION

Figure 1:
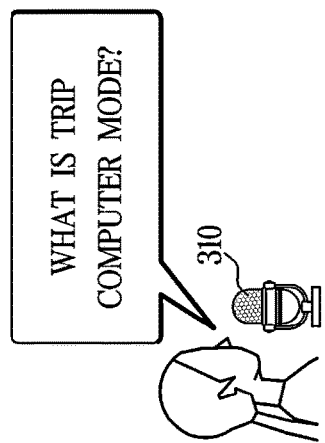
FIG. 1 is a diagram illustrating an example of providing an answer to a user's question by a question answering system according to an embodiment.

The embodiments set forth herein and illustrated in the configuration of the present disclosure are only preferred embodiments, so it should be understood that they may be replaced with various equivalents and modifications at the time of the present disclosure.

Terminologies used herein are for the purpose of describing particular embodiments only and is not intended to limit the present disclosure. It is to be understood that the singular forms are intended to include the plural forms as well, unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms such as "~part", "~device", "~block", "~member", "~module", and the like may refer to a unit for processing at least one function or act. For example, the terms may refer to at least process processed by at least one hardware, such as field-programmable gate array (FPGA)/ application specific integrated circuit (ASIC), software stored in memories or processors.

It will be understood that, although the terms first, second, etc. may be used herein to describe various elements, these elements should not be limited by these terms.

Reference numerals used for method steps are just used for convenience of explanation, but not to limit an order of the steps. Thus, unless the context clearly dictates otherwise, the written order may be practiced otherwise.

The term "at least one" used herein includes any and all combinations of the associated listed items. For example, it should be understood that the term "at least one of a, b, or c" may include only a, only b, only c, both a and b, both a and c, both b and c, or all of a, b and c.

Hereinafter, embodiments of the disclosure are described in detail with reference to the accompanying drawings.

FIG. 1 is a diagram illustrating an example of providing an answer to a user's question by a question answering system according to an embodiment.

A question answering system according to an embodiment may operate by linking to a mobile device such as a smartphone or a tablet personal computer (PC), a wearable device such as a smart watch or smart glasses, or a specific electronic device such as an artificial intelligence (AI) speaker, home appliances, or a vehicle.

A user may input a user's utterance to a microphone provided in an electronic device, and be provided with a response to the user's utterance through a user interface such as a display or a speaker provided in the electronic device.

For example, when an electronic device linked to the question answering system according to an embodiment is a vehicle, as shown in FIG. 1, in response to a question input by a user through a microphone 310, "what is a trip computer mode?", the vehicle may transmit the input question to the question answering system.

The question answering system according to an embodiment may search for an answer span to the transmitted question, and transmit the retrieved answer span to the vehicle again. Like the example shown in FIG. 1, the vehicle may highlight the answer span to the question, and visually output the answer span to the question together with adjacent sentences on a display 320, or audibly output through the speaker.

Like the example above, when a question related to a specific electronic device is included in a user's utterance, the question answering system may search a manual of the corresponding electronic device for an answer span to the question. In general, a manual is provided in text form. Accordingly, the question answering system may search manuals for an answer to a user's question using a machine reading comprehension technology.

Figure 2:
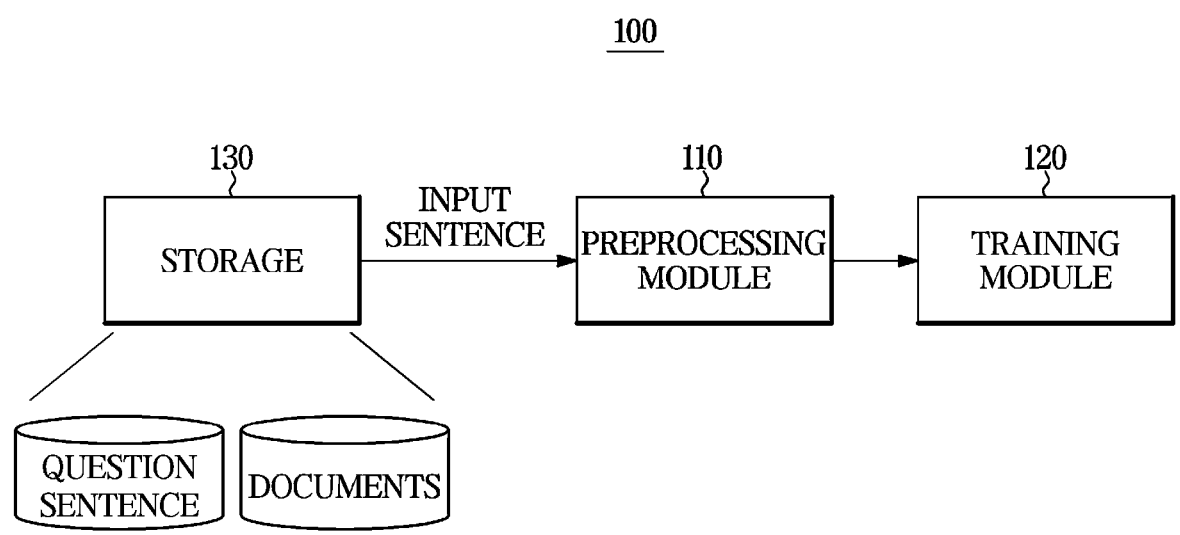
FIG. 2 is a block diagram illustrating operations of an apparatus for training a machine reading comprehension model according to an embodiment.
Figure 3:
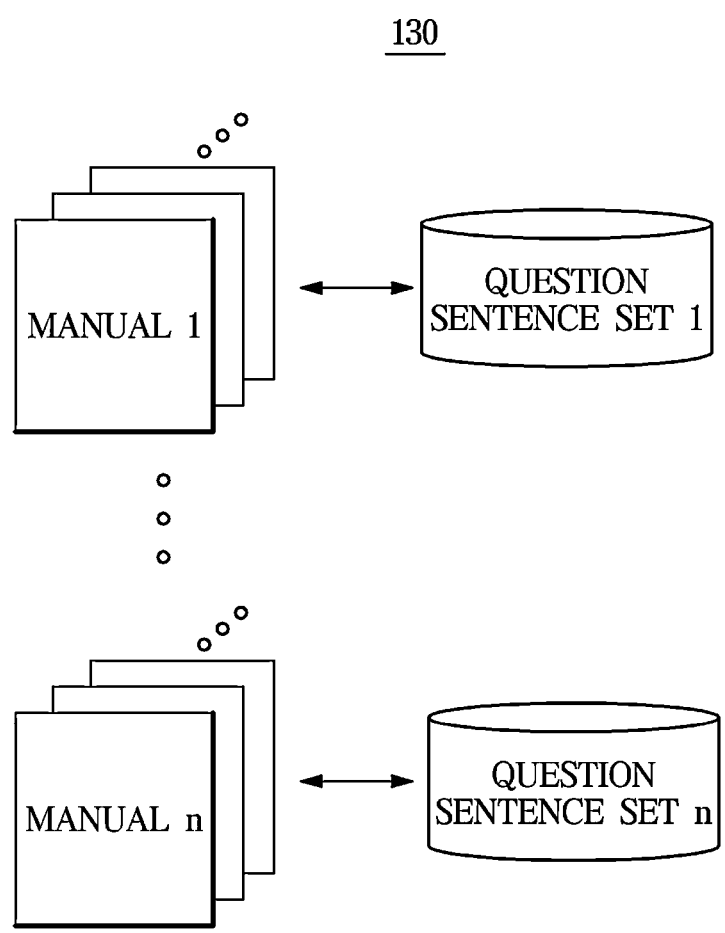
FIG. 3 is a diagram illustrating an example of training data stored in an apparatus for training a machine reading comprehension model according to an embodiment.

FIG. 2 is a block diagram illustrating operations of an apparatus for training a machine reading comprehension model according to an embodiment. FIG. 3 is a diagram illustrating an example of training data stored in an apparatus for training a machine reading comprehension model according to an embodiment.

According to an embodiment, an apparatus for training a machine reading comprehension model 100 (hereinafter, a training apparatus 100) is an apparatus for training a machine reading comprehension model used for searching for an answer span to a question input by a user in a question answering system.

Referring to FIG. 2, the training apparatus 100 according to an embodiment includes a preprocessing module 110 performing preprocessing on an input sentence, a training module 120 training a machine reading comprehension model, and a storage 130 storing training data.

The preprocessing module 110 may convert the input sentence into a format that may be processed by the deep learning model, before the input sentence is input to the training module 120.

The training module 120 may store a deep learning model searching documents for an answer span to an input question, i.e., the machine reading comprehension model, and may train the machine reading comprehension model using training data.

The storage 130 may store the training data used for training the machine reading comprehension model. The training data may include question sentences used as input, and documents including answers to each question sentence.

For example, a case of training a machine reading comprehension model searching for an answer to an input question about a function of or how to use a specific device is assumed. In this case, as shown in FIG. 3, a text manual 1 of a device 1, and a question sentence set 1 which is a set of expected question sentences about the device 1 may be stored as a pair of training dataset.

Also, in a training dataset, a passage including an answer span to a corresponding question sentence in a document may be matched for each question sentence and stored. That is, the training dataset may consist of a question, an answer span to the question, and a passage including the answer span.

In the same manner, a text manual N (N is an integer greater than or equal to 2) of a device N, and a question sentence set N which is a set of expected question sentences of the device N may be stored as a pair of training dataset.

When training the machine reading comprehension model, a single question sentence among the question sentence sets stored in the storage 130, and sentences of a passage including an answer span to the corresponding question sentence among the stored manuals 1 to N, may be input to the machine reading comprehension model.

For example, when the machine reading comprehension model is used for question and answering about a vehicle, a manual for each vehicle model and a question sentence set corresponding thereto may be stored in the storage 130 and used as training data.

The above-described preprocessing module 110 and the training module 120 may include at least one memory storing a program performing the above operations and at least one processor implementing a stored program.

However, the constituent components such as the preprocessing module 110 and the training module 120 are distinguished by an operation, not by physical configuration. Accordingly, the constituent components are not necessarily implemented with separate memories or processors, and at least a portion of constituent components may share a memory or processor.

Also, the storage 130 is not necessarily physically distinguished from the preprocessing module 120 or the training module 130, and may share a memory with the preprocessing module 120 or the training module 130.

Figure 4:
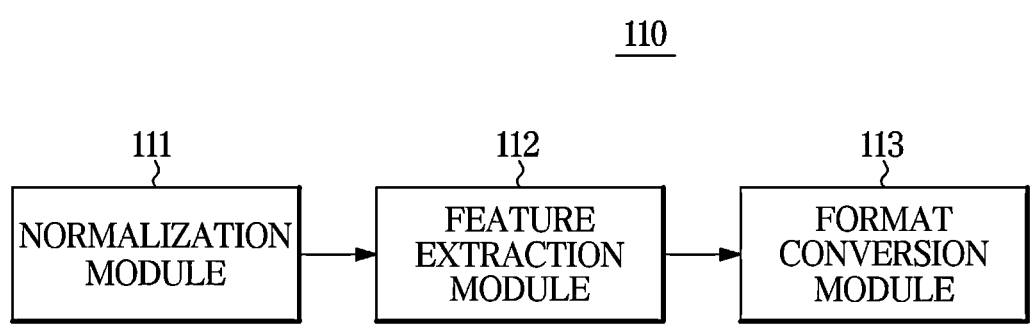
FIG. 4 is a block diagram illustrating detailed operations of a preprocessing module included in an apparatus for training a machine reading comprehension model according to an embodiment.
Figure 5:
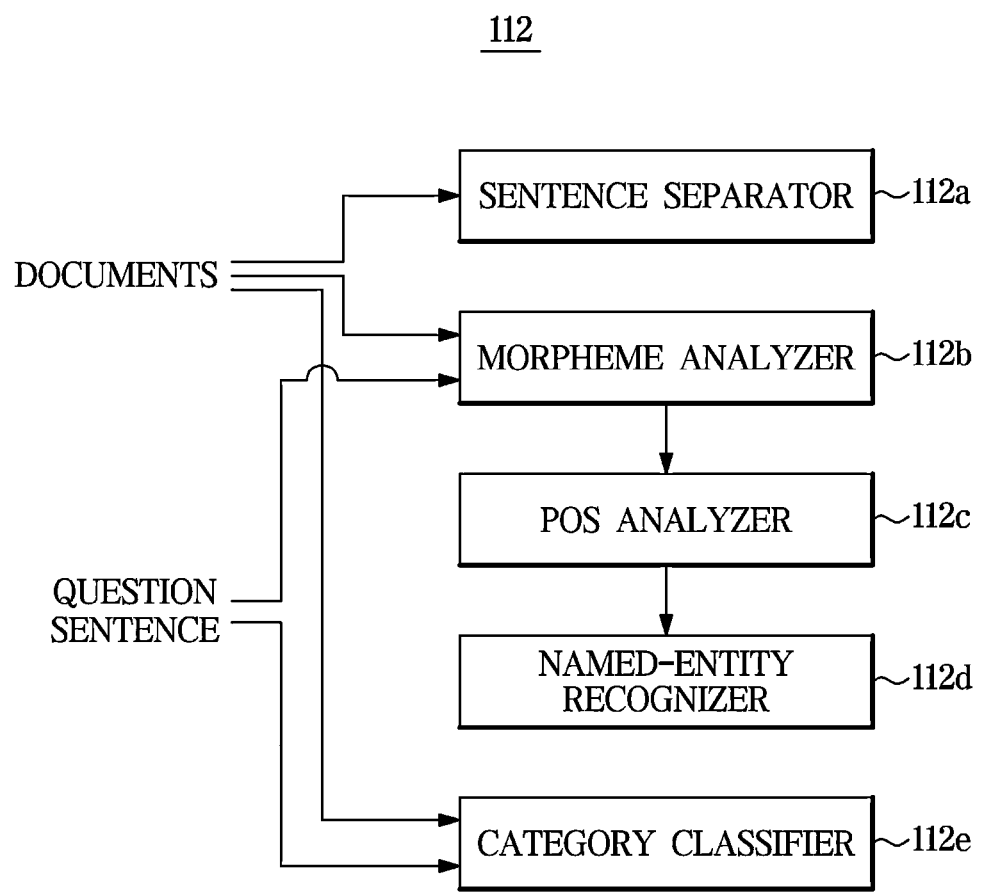
FIG. 5 is a block diagram illustrating detailed operations of a feature extraction module included in an apparatus for training a machine reading comprehension model according to an embodiment.

FIG. 4 is a block diagram illustrating detailed operations of a preprocessing module included in an apparatus for training a machine reading comprehension model according to an embodiment. FIG. 5 is a block diagram illustrating detailed operations of a feature extraction module included in an apparatus for training a machine reading comprehension model according to an embodiment.

Referring to FIG. 4, the preprocessing module 110 may include a normalization module 111 normalizing an input sentence, a feature extraction module 112 extracting a feature from the input sentence, and a format conversion module 113 converting a format of the input sentence.

Here, the input sentence may include a question sentence, and sentences included in a passage including an answer span to the question sentence.

The normalization module 111 may perform normalization to exclude meaningless data such as special characters, symbols, and the like, from the input sentence. It is assumed that all the input sentence processed by the constituent components to be described later is a normalized input sentence.

The feature extraction module 112 may extract a feature from the normalized input sentence, and the format conversion module 113 may assign indexes to the input sentence based on the extracted feature.

Referring to FIG. 5, the feature extraction module 112 may include a sentence separator 112a, a morpheme analyzer 112b, a part-of-speech (POS) analyzer 112c, a named-entity recognizer 112d and a category classifier 112e.

The sentence separator 112a may separate input sentences. For example, input sentences may be separated based on a punctuation mark such as a question mark "?", a period ".", and an exclamation mark "!".

The morpheme analyzer 112b may separate the input sentence in units of morphemes, and the POS analyzer 112c may analyze a POS for each morpheme, and tag a POS for each morpheme. The input sentence may be tokenized based on a result of morpheme analysis.

Alternatively, for tokenization of the input sentence, a byte pair encoding (BPE) algorithm may be used. By using the BPE algorithm, an out of vocabulary (OOV) probability may be reduced.

An operation of the named-entity recognizer 112d may be defined as named-entity recognition (NER). NER is one of information extraction tasks to find a specific type of word in a sentence. For example, the named-entity recognizer 112d may find a word related to a device, which is a subject of a question, e.g., a word related to a vehicle, in an input sentence, by performing named-entity recognition.

The named-entity recognizer 112d may perform labeling on an entity name, detected in the input sentence, using a B-I-O tag. For example, B may be assigned to a part at which a vehicle-related named entity begins, I may be assigned to a part belonging to a vehicle-related named entity, and O may be assigned to a part that is not a vehicle-related named entity.

The category classifier 112e may classify a category to which a question sentence belongs among a plurality of predefined categories. For example, when the machine reading comprehension model is used for question and answering about a vehicle, depending on a topic of the question, categories may be classified as a basic guidelines and information, safety precautions, safety system, dashboard, convenient features, starting and driving your vehicle, emergency situations, maintenance, trouble shooting, check trouble, how to maintain, my car information, and the like.

The training apparatus 100 according to an embodiment may use named-entity information and category information about a specific device as a feature in training a machine reading comprehension model, and thus a performance of the machine reading comprehension model for the corresponding device may be improved.

Also, although not illustrated, an input sentence may be separated in units of syllables, and syllables as well as morphemes may be used as features. By using both syllables and the morphemes as features, unknown words or infrequent words may be analyzed, and thus a performance of the machine reading comprehension model may be improved.

FIG. 6 is a table illustrating an example of a feature extraction result of an apparatus for training a machine reading comprehension model according to an embodiment.

In the example below, described is the example where an input question sentence is "ANJEONBELTEUGA PPAJIJI ANHNEUNDE EOTTEOHGE HAEYA HAJI?" (meaning that 'the seatbelt won't come off, what should I do?').

Referring to FIG. 6, the morpheme analyzer 112b separates the input sentence in units of morphemes, to output a result "ANJEON, BELTEU, GA, PPAJI, JI, ANH, NEUNDE, EOTTEOHGE, HA, AYA, HA, JI".

The POS analyzer 112c analyzes a POS for each morpheme and tag the analyzed POS to each morpheme, to output a result "ANJEON/NNG, BELTEU/NNG, GA/JKS, PPAJI/VV, JI/EC, ANH/VX, NEUNDE/EC, EOTTEOHGE/MAG, HA/VV, AYA/EC, HA/VX, JI/EF".

When the named-entity recognizer 112d performs named-entity recognition on the input sentence, separated into morpheme units, the 'ANJEONBELTEU' may be recognized as a vehicle-related named-entity, the morpheme 'ANJEON' is labeled with B tag, and the morpheme 'BELTEU' is labeled with I tag.

In addition, when the input sentence is separated into syllable units, a result "AN, JEON, BEL, TEU, GA, PPA, JI, JI, ANH, NEUN, DE, EO, TTEOH, GE, HAE, YA, HA, JI", may be output.

Meanwhile, at least a portion of the features described above may be drawn from an external server. That is, the feature extraction module 112 may directly extract only a portion of the above-described features, and the other remaining features may be acquired by requesting the external server. Alternatively, the feature extraction module 112 may be omitted and the entire features described above may be acquired from the external server.

The format conversion module 113 may perform indexing on the input sentence based on the feature extraction result. Specifically, the format conversion module 113 may assign an index to each of a plurality of features or a plurality of words constituting the input sentence by using a predefined dictionary. The index assigned in the format conversion process may indicate a position of a word in the dictionary.

The format conversion module 113 may perform indexing on the input sentence, "ANJEONBELTEUGA PPAJIJI ANHNEUNDE EOTTEOHGE HAEYA HAJI", in units of morphemes or in units of syllables. Indexes assigned to the input sentence by the format conversion module 113 may be used in an embedding process to be described later.

In the following embodiments to be described below, the input sentence where preprocessing has been completed is referred to as an input sequence. The input sequence may be processed in units of tokens, and in the present example, tokens in units of morpheme are used. Accordingly, the input sequence input to the machine reading comprehension model consists of a plurality of tokens in units of morpheme.

Figure 7:
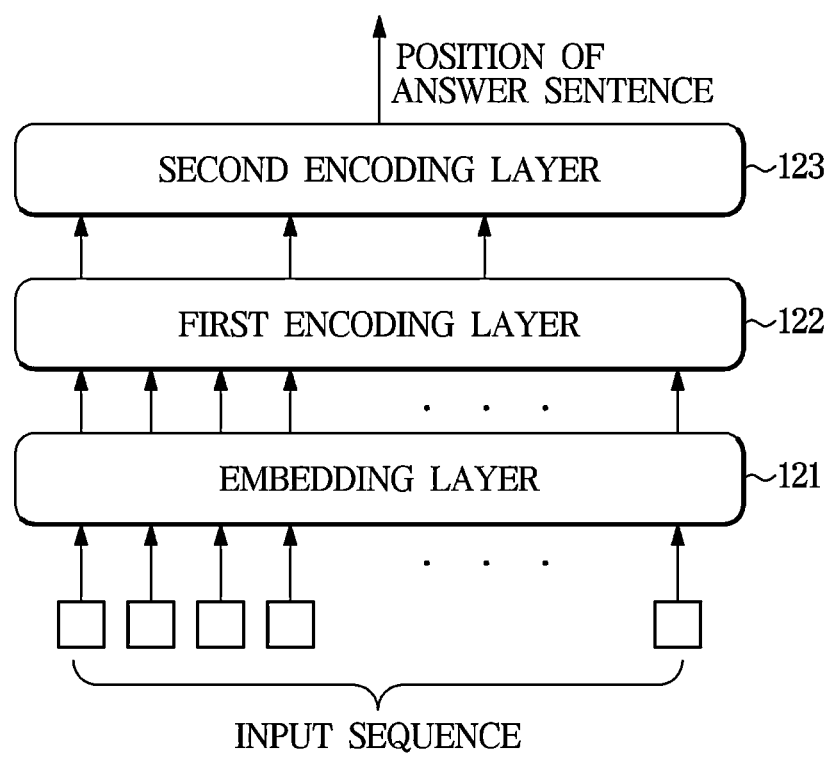
FIG. 7 is a diagram briefly illustrating a layer structure of a machine reading comprehension model trained in an apparatus for training a machine reading comprehension model according to an embodiment.

FIG. 7 is a diagram briefly illustrating a layer structure of a machine reading comprehension model trained in an apparatus for training a machine reading comprehension model according to an embodiment.

Referring to FIG. 7, a machine reading comprehension model stored in the training module 120 may be trained based on deep learning. Specifically, the machine reading comprehension model may include an embedding layer 121 embedding an input sequence, a first encoding layer 122 encoding embeddings of the input sequence at a word level, and a second encoding layer 123 encoding embeddings of the input sequence at a sentence level.

The embedding layer 121 may perform embedding on the input sequence using a pre-trained language model, thereby converting into vectors accurately representing a meaning of each word constituting the input sequence. Accordingly, performances of word-level encoding and sentence-level encoding performed afterward may be improved.

The embedding layer 121 may employ a bidirectional encoder representations from transformers (BERT) model or a generative pre-trained transformer (GPT) model as the pre-trained language model.

The embeddings output from the embedding layer 121 may be input to the first encoding layer 122, and the first encoding layer 122 encodes the embeddings to output a position of an answer span to a question sentence.

Because embeddings for each of the plurality of tokens included in the input sequence are input to the first encoding layer 122, the position of the answer span output from the first encoding layer 122 may indicate a starting position and an ending position of the answer span. The starting position of the answer span may indicate a position of a token corresponding to a start of the answer span in the input sequence, and the ending position of the answer span may indicate a position of a token corresponding to an end of the answer span in the input sequence.

Meanwhile, the starting position and the ending position of the answer span may or may not match a starting position and an ending position of a sentence including the answer span.

For example, when an input question sentence is "the seatbelt won't come off, what should I do?" shown in the example of FIG. 5, and a sentence " . . . if the seatbelt does not come off, press the buckle and it will come off." is included in a passage input together, "press the buckle and it will come off" may be an answer span. That is, a starting position of the answer span may not match a starting position of the sentence.

In the passage above, when an index indicating a position of "buckle" is 10 and an index indicating a position of "come off" is 12, the first encoding layer 122 may output [10, 12].

Among hidden states of the first encoding layer 122, hidden states of tokens separating the input sentences or hidden states of tokens indicating the start of the input sentences may be input to the second encoding layer 123. For example, a hidden state of [CLS] token and a hidden state of [SEP] token may be input to the second encoding layer 123.

The second encoding layer 123 may encode the hidden state of [CLS] token and the hidden state of [SEP] token, thereby outputting a position of a sentence including the answer span to the question sentence from among the input sentences.

Figure 8:
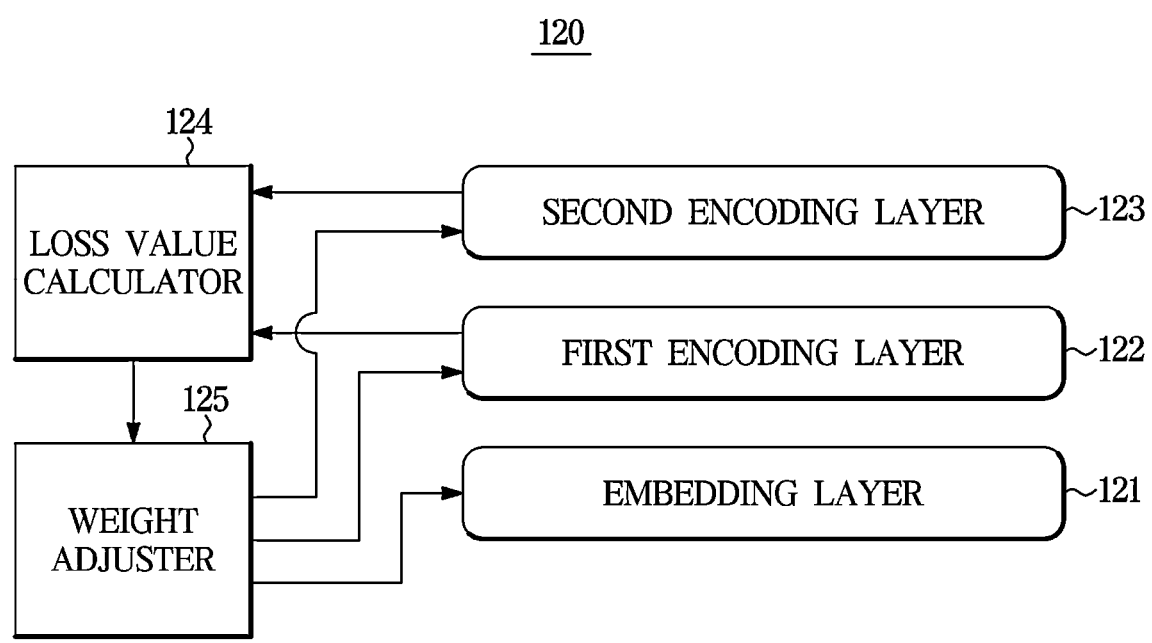
FIG. 8 is a block diagram illustrating operations of calculating a loss value and adjusting a weight in an apparatus for training a machine reading comprehension model according to an embodiment.

FIG. 8 is a block diagram illustrating operations of calculating a loss value and adjusting a weight in an apparatus for training a machine reading comprehension model according to an embodiment.

Referring to FIG. 8, the training module 120 may further include a loss value calculator 124 calculating a loss value for an output of the first encoding layer 122 and a loss value for an output of the second encoding layer 123, and a weight adjuster 125 adjusting a weight of a machine reading comprehension model.

The loss value calculator 124 may calculate a first loss value for a starting position of an answer span and a second loss value for an ending position of the answer span using a loss function. In this instance, the starting position of the answer span and the ending position of the answer span are an output of the first encoding layer 122.

Also, the loss value calculator 124 may calculate a third loss value for a position of a sentence including the answer span (answer sentence) which is an output of the second encoding layer 123, and calculate a total loss value by summing the first loss value, the second loss value and the third loss value.

The weight adjuster 125 may adjust the weight of the machine reading comprehension model in a direction to minimize the calculated total loss value. Specifically, the weight adjuster 125 may adjust weights of hidden layers of the machine reading comprehension model in a direction to minimize the calculated total loss value.

Accordingly, the machine reading comprehension model trained by the training apparatus 100 according to an embodiment may perform both word-level training and sentence-level training (performing multi-task learning). Accordingly, a performance of searching for an answer span to a question sentence may be improved.

Figure 9:
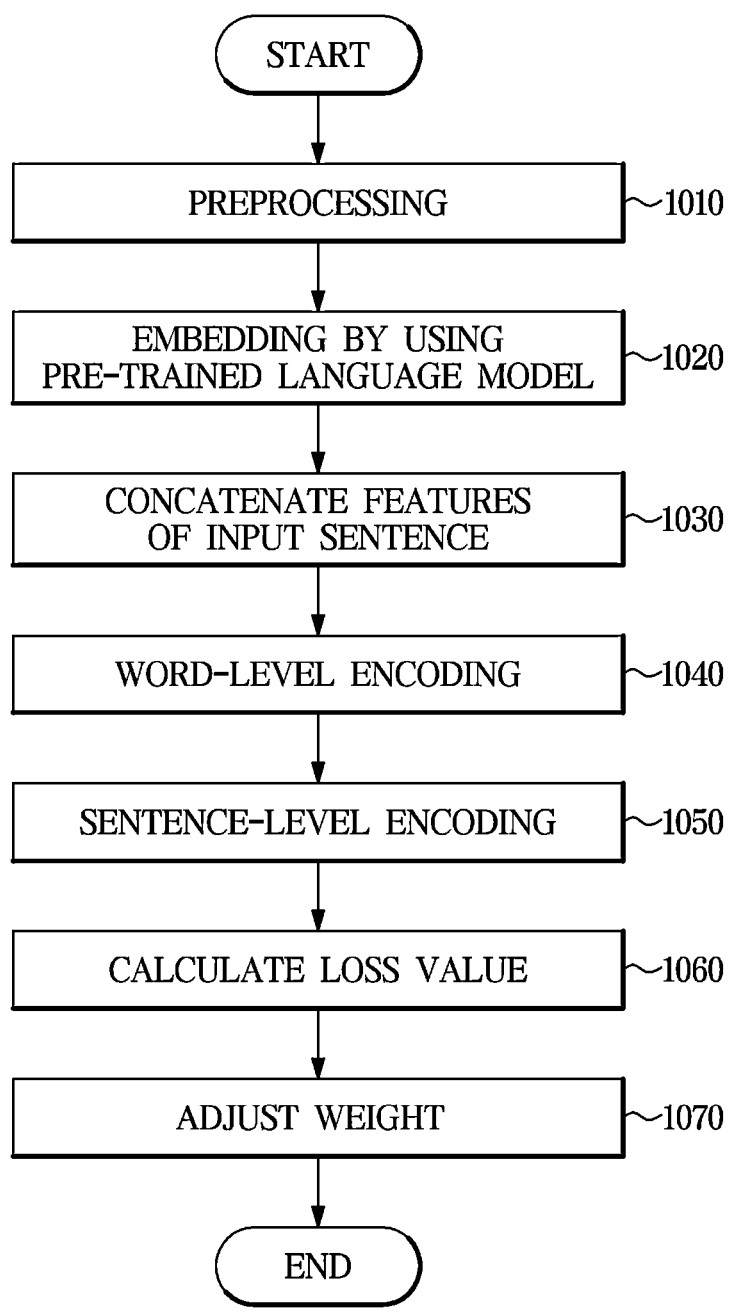
FIG. 9 is a flowchart illustrating a method for training a machine reading comprehension model according to an embodiment.
Figure 10:
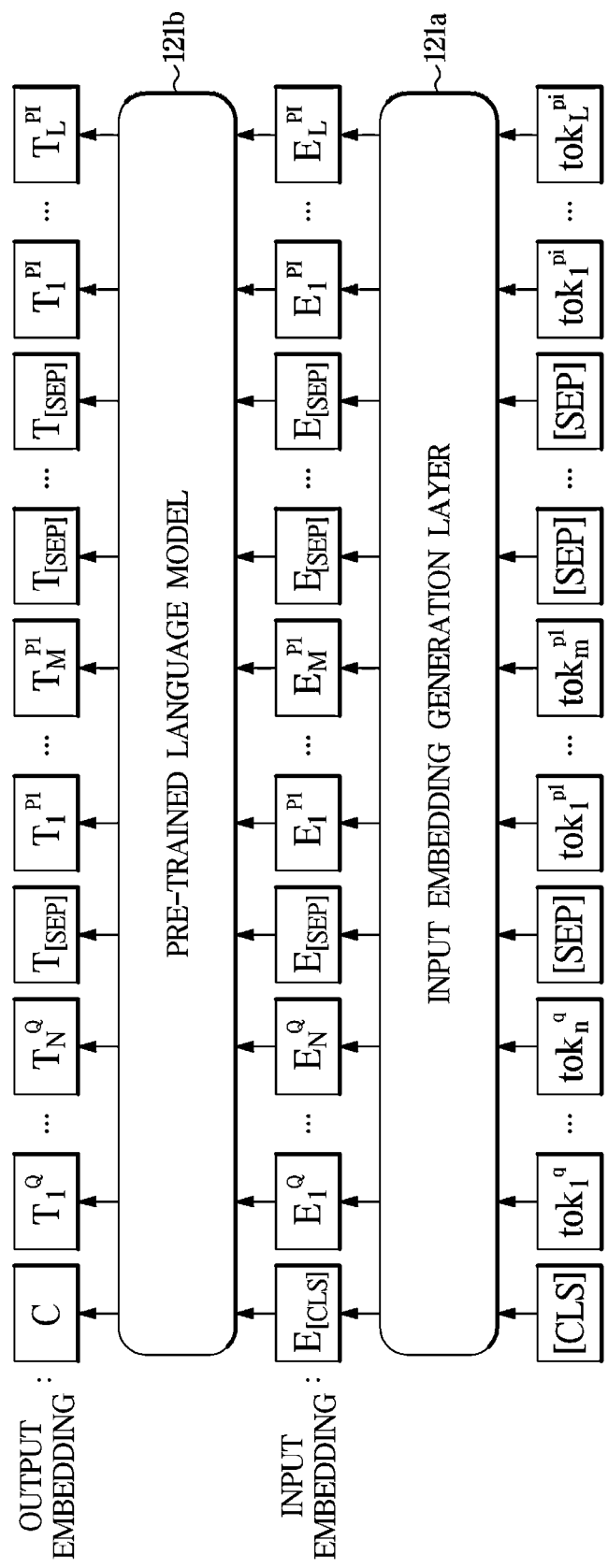
FIGS. 10 and 11 are diagrams illustrating an operation of generating an input vector input to a pre-trained language model, in a method for training a machine reading comprehension model according to an embodiment.
Figure 11:
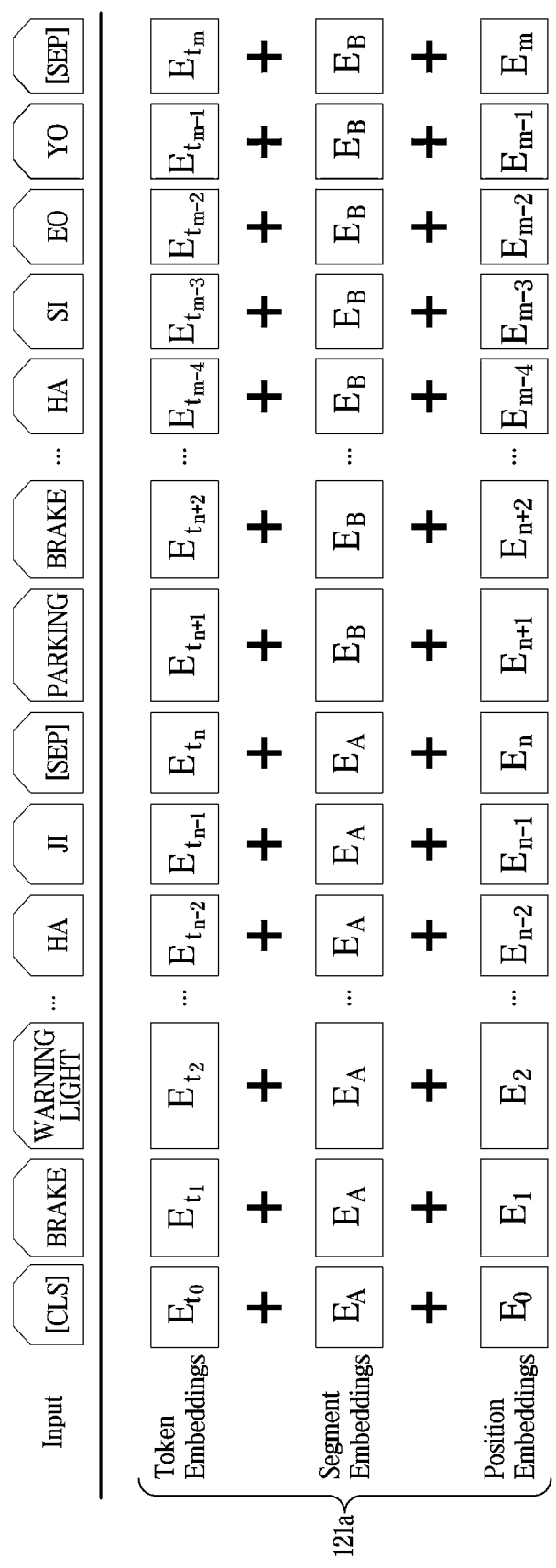
Figure 12:
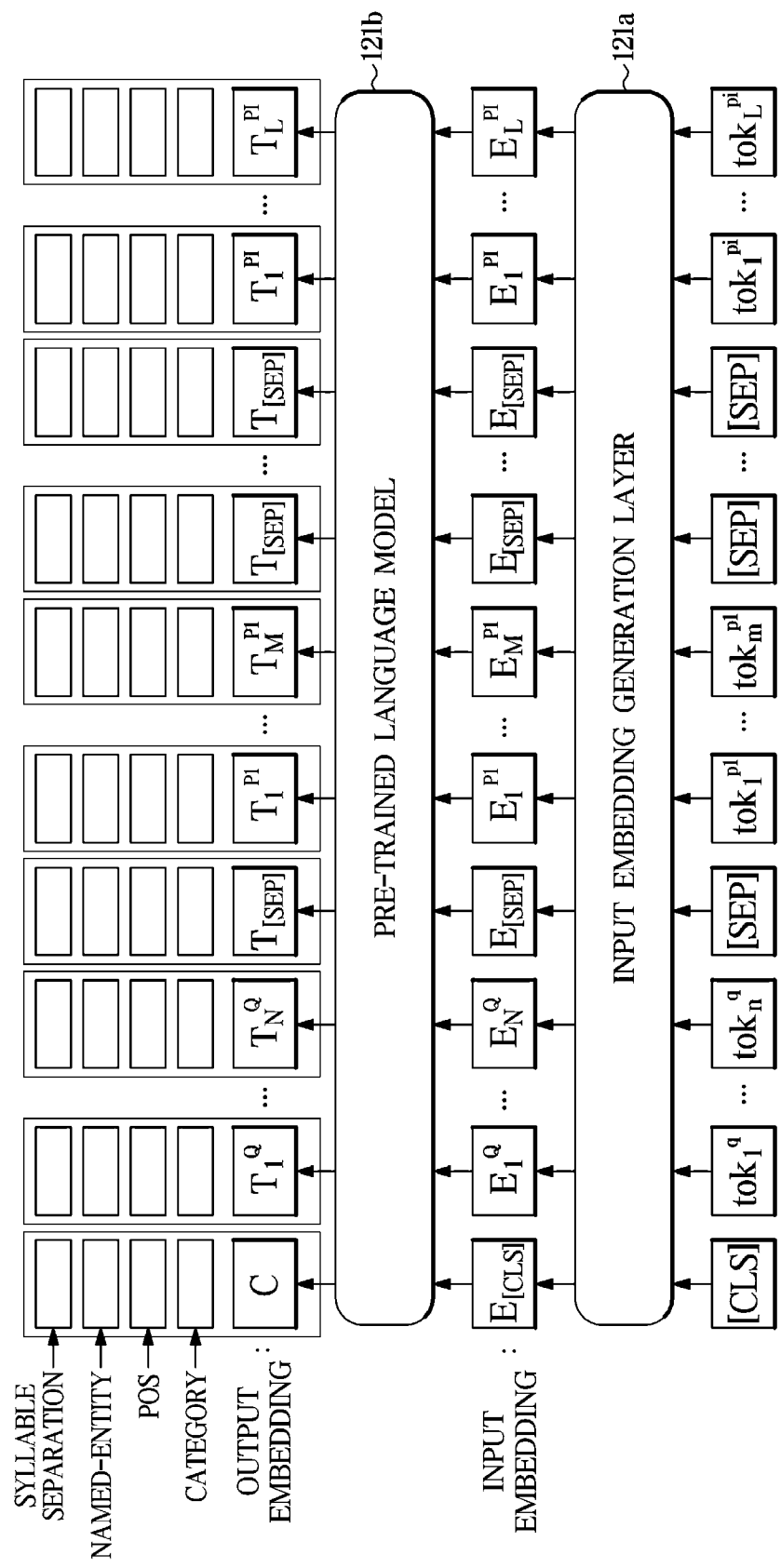
FIG. 12 is a diagram illustrating an operation of concatenating embedding vectors output from a pre-trained language model with features of an input sentence, in a method for training a machine reading comprehension model according to an embodiment.
Figure 13:
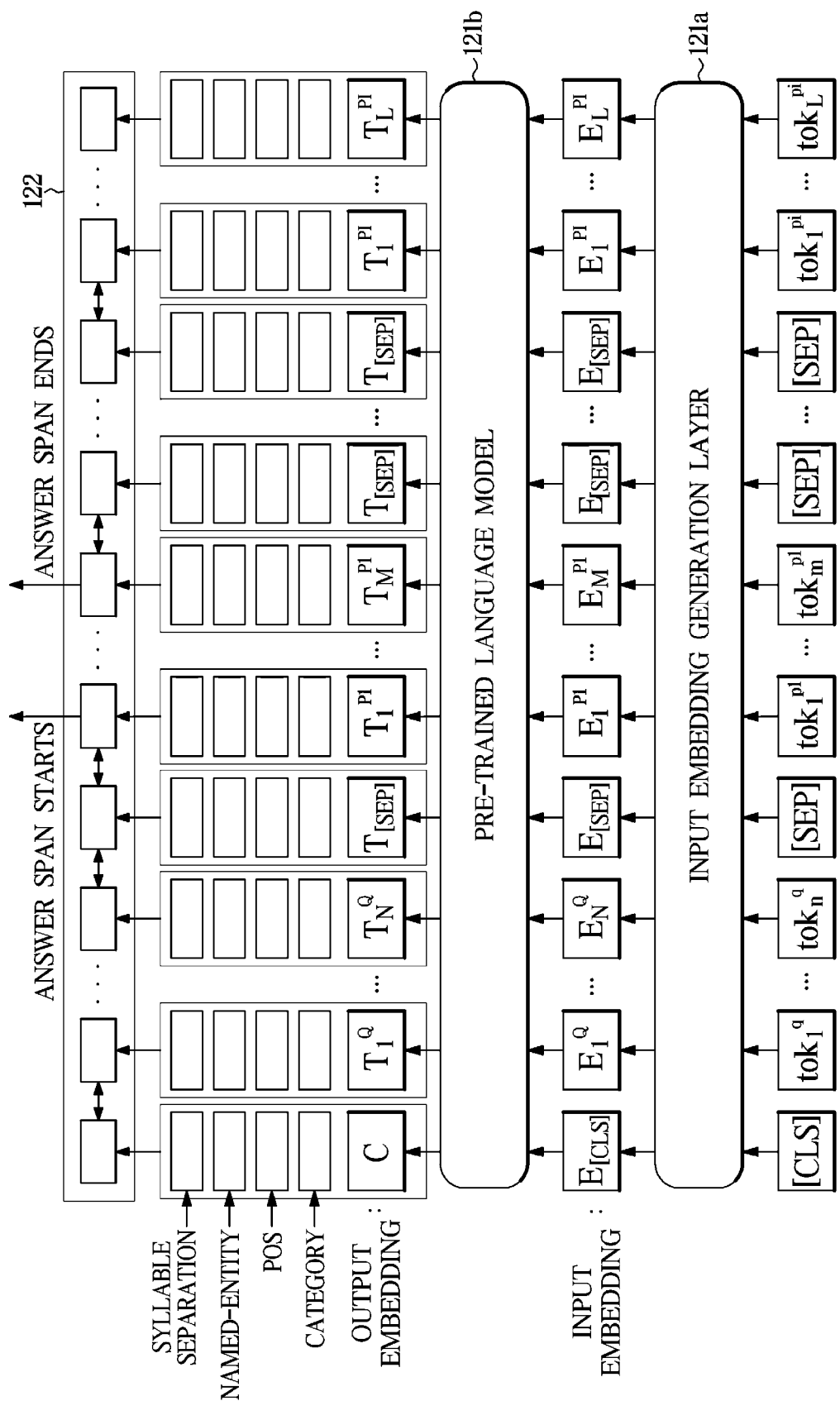
FIG. 13 is a diagram illustrating a word-level encoding process in a method for training a machine reading comprehension model according to an embodiment.
Figure 14:
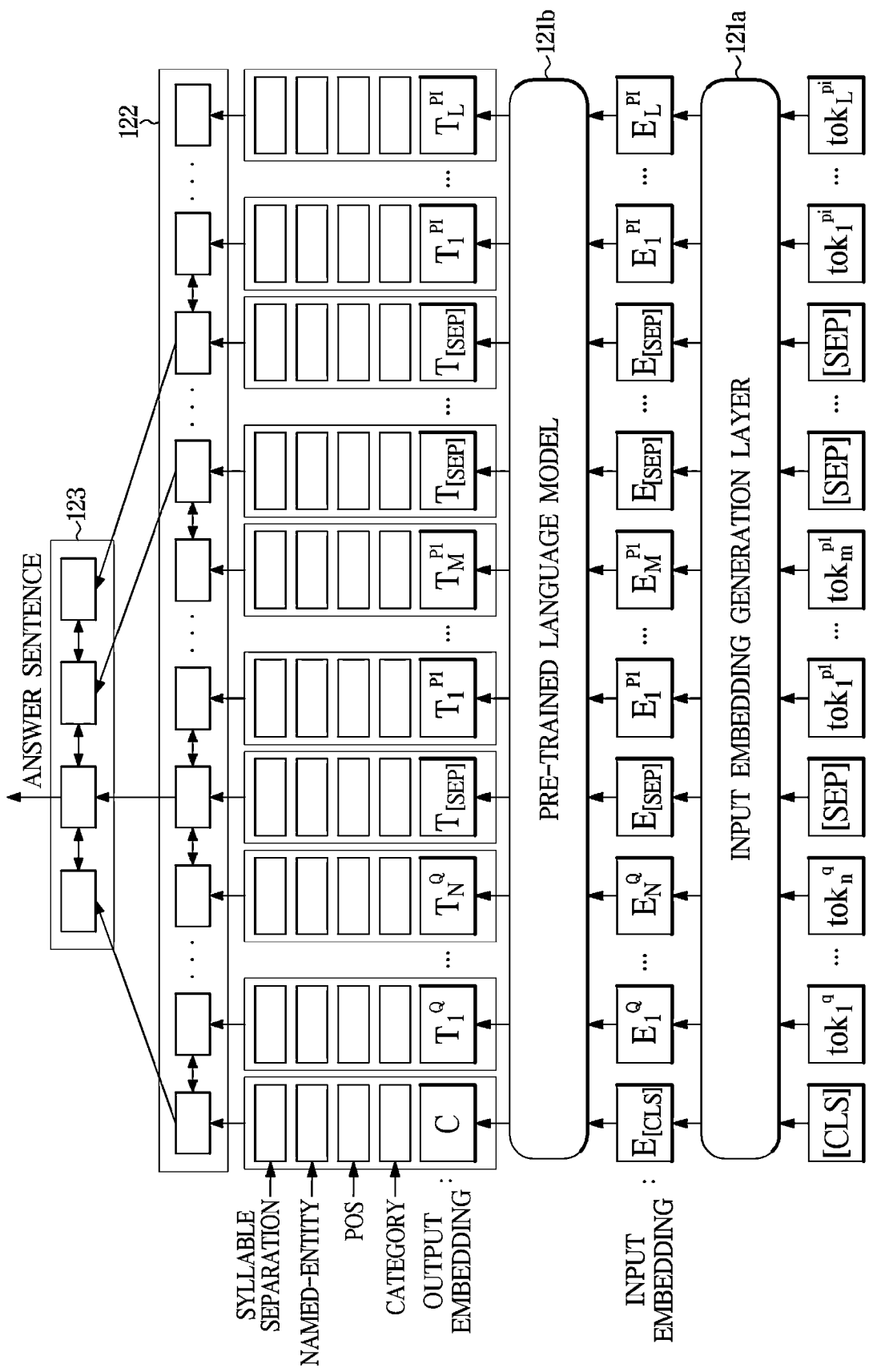
FIG. 14 is a diagram illustrating a sentence-level encoding process in a method for training a machine reading comprehension model according to an embodiment.

FIG. 9 is a flowchart illustrating a method for training a machine reading comprehension model according to an embodiment. FIGS. 10 and 11 are diagrams illustrating an operation of generating an input vector input to a pre-trained language model, in a method for training a machine reading comprehension model according to an embodiment. FIG. 12 is a diagram illustrating an operation of concatenating embedding vectors output from a pre-trained language model with features of an input sentence, in a method for training a machine reading comprehension model according to an embodiment. FIG. 13 is a diagram illustrating a word-level encoding process in a method for training a machine reading comprehension model according to an embodiment. FIG. 14 is a diagram illustrating a sentence-level encoding process in a method for training a machine reading comprehension model according to an embodiment.

Referring to FIG. 9, a method for training a machine reading comprehension model (hereinafter, a training method) according to an embodiment may be performed using the above-described training apparatus 100. Accordingly, a description on the training apparatus 100 described above is applicable to the training method, even when not specifically described below.

Also, a description on the training method may be applied to the training apparatus 100, even when not specifically described below.

According to the training method illustrated in FIG. 9, preprocessing on an input sentence is performed (1010). Specifically, the input sentence may be normalized, features of the input sentence may be extracted, and an input format may be converted.

The features of the input sentence obtained in the preprocessing may include at least one of morpheme analysis result, POS tagging result, category classification result, or syllable separation result.

Also, as described above, at least a portion of feature extraction on the input sentence may be obtained by another external system or server. For example, morpheme analysis or category classification on the input sentence may be requested to an external server, and a result thereof may be obtained from the external server.

The input sentence may include a question sentence, and a plurality of sentences included in a passage corresponding to the question sentence. By preprocessing the input sentence, an input sequence consisting of a plurality of tokens may be generated.

When the preprocessing on the input sentence is completed, embedding may be performed by using a pre-trained language model (1020).

A bidirectional encoder representations from transformers (BERT) or efficiently learning an encoder that classifies token replacements accurately (ELECTRA) may be used as the pre-trained language model. In the embodiment, embedding is performed on the input sentence by using the pre-trained language model, thereby improving a performance of searching for an answer span.

In the example, using BERT as the pre-trained language model is described. An operation of generating a vector input to BERT is described with reference to FIGS. 10 and 11.

Referring to FIG. 10, the embedding layer 121 may include a pre-trained language model 121*b*, and an input embedding generation layer 121*a* that generates input embeddings to be input to the pre-trained language model 121*b*.

As shown in FIG. 11, the input sequence includes a plurality of tokens, and a [CLS] token located at a beginning of a sentence may be included in the plurality of tokens. Through an encoding process to be described later, a vector for the [CLS] token may imply a meaning of the input sentence.

[SEP] tokens separating sentences may be positioned between the sentences. Through the encoding process to be described later, a meaning of adjacent sentence may be implied in the [SEP] token.

The input embedding generation layer 121*a* may generate the input embeddings by embedding the input sequence, before inputting the input sequence to BERT. For example, as shown in FIG. 11, the input embedding generation layer 121*a* may perform token embedding, segment embedding, and position embedding on the plurality of tokens included in the input sequence, and sum the results of the embeddings.

The token embedding may be performed by using word-piece embeddings. Specifically, the token embedding is performed in units of character, and a sub-word that appears frequently and has a longest length may be generated as a single unit. A word that does not appear frequently may be made as a sub-word again.

The segment embedding is for distinguishing two sentences. In BERT, two sentences are distinguished by [SEP] token positioned between the two sentences, and the two sentences are designated and input as a single segment.

The position embedding is for learning location information.

The input embedding generation layer 121*a* may generate the input embeddings to be input to BERT by summing the results of the token embedding, segment embedding, and position embedding for each token.

The input embeddings are input to BERT which is the pre-trained language model. BERT has a structure in which transformer encoders are stacked. Depending on a version, 12 transformer encoders may be stacked to implement 12 layers, or 24 transformer encoders may be stacked to implement 24 layers.

When 12 transformer encoders exist, a hidden layer of BERT has 768 dimensions, and the number of attention heads is 12. When 24 transformer encoders exist, a hidden layer of BERT has 1024 dimensions, and the number of attention heads is 16.

BERT uses contextual embeddings. When BERT has 12 layers, a hidden layer is defined to have 768 dimensions, and thus all the words in the input sentence become 768-dimensional embedding vectors (input embeddings) and are used as input of BERT.

BERT outputs 768-dimensional vectors (output embeddings) for each word after internal operations. The output embeddings after the BERT operation become embeddings referring to all contexts of sentence.

When input to BERT, the vector of the [CLS] token was simply an embedding that passes through a token embedding layer, a segment embedding layer and a position embedding layer. When output from BERT, however, the vector of the [CLS] token becomes a vector with contextual information by referring to vectors of all other words.

With respect to the vectors of the other words as well as the vector of the [CLS] token, operation is performed with reference to all the words, and is performed in all the 12 layers of BERT.

BERT may train the input embeddings using two methods, masked language model (MLM) and next sentence prediction (NSP). According to the MLM method, 15% of the words in the input text are randomly masked, and the masked words are predicted. According to the NSP method, training is performed in a manner that identifies whether two sentences are consecutive sentences.

Once embedding is completed, the output embeddings output from the pre-trained language model are concatenated to the features of the input sentence obtained during the preprocessing (1030).

During the preprocessing, the input sentence was separated in units of morpheme, and the named-entity recognition result, the POS analysis result, the category classification result, and the syllable separation result were obtained. As shown in FIG. 12, the embedding layer 121 may concatenate the output embeddings output from the pre-trained language model to at least one of the named-entity recognition result, POS analysis result, category classification result, or syllable separation result corresponding to each token.

Although it is illustrated in FIG. 12 that four features are all concatenated, the training method is not limited thereto. That is, only one, two or three features of the obtained features may be concatenated as well.

As such, before inputting the output embeddings to the encoding layer for searching for an answer sentence, by concatenating the features of each token to the output embeddings, a performance of searching for the answer sentence may be improved.

The output embeddings concatenated to the features are input to the first encoding layer to perform word-level encoding (1040).

Referring to FIG. 13, the output embeddings output from the embedding layer 121 may be input to the first encoding layer 122 composed of a recurrent neural network (RNN) such as a gated recurrent unit (GRU), a long short term memory (LSTM), a simple recurrent unit (SRU), and the like.

A score may be calculated for each hidden state of the first encoding layer 122, and a starting position and an ending position of the answer span for the question sentence may be found based on the calculated score.

For example, it is assumed that an input question sentence is "what should I do if the brake warning light comes on?", and a passage corresponding to the input question sentence is "the warning light comes on when the parking brake is applied or the brake fluid is low. When the ignition is turned on with the parking brake released, the warning light comes on, and if there is no problem with the brakes, the warning light will be turned off after starting. If the warning light does not go out even after the engine is started and the parking brake is released, check the brake fluid level. If the brake fluid is low, refill it. If the brake warning light is still turned on after refilling the brake fluid, please have your vehicle inspected at service center".

In the above example, an answer span to the question sentence is "when the ignition is turned on with the parking brake released, the warning light comes on, and if there is no problem with the brakes, the warning light will be turned off after starting".

Accordingly, a result output by performing word-level encoding by the first encoding layer 122 includes a position of "when" (a starting position of the answer span) and a position of "starting" (an ending position of the answer span) in an input sequence.

It has been described in the embodiment that encoding performed by the first encoding layer 122 is word-level encoding. In terms of agglutinative languages such as Korean, however, morphemes and words do not always match. Accordingly, even though word-level encoding has been described for intuitive explanation, it is apparent to those skilled in the art that a unit of encoding may be a unit smaller than a word depending on a language of an input sentence.

The output embeddings concatenated to the features are input to the second encoding layer to perform sentence-level encoding (1050).

In order to perform sentence-level encoding, embeddings of the [CLS] token and the [SEP] token may be input to the second encoding layer 123.

Here, the output embeddings concatenated to the features may be directly input to the second encoding layer 123, and as shown in FIG. 14, hidden states of the [CLS] token and the [SEP] token that imply information of adjacent sentences in the first encoding layer 122 may be used as hidden states of the second encoding layer 123.

The second encoding layer 123 may be composed of a recurrent neural network (RNN) such as a gated recurrent unit (GRU), a long short term memory (LSTM), a simple recurrent unit (SRU), and the like.

A score may be calculated for each hidden state of the second encoding layer 123, and a position of a sentence including the answer span (answer sentence) to the question sentence may be found based on the calculated score. For example, bi-linear sequence attention may be used to calculate a score.

A loss value may be calculated based on results of the word-level encoding and the sentence-level encoding (1060). Weights of hidden layers may be adjusted in a direction to minimize the calculated loss value.

The loss value calculator 124 may calculate a first loss value for a starting position of the answer span and a second loss value for an ending position of the answer span. Here, the starting position and the ending position of the answer span correspond to an output of the first encoding layer 122. Also, the loss value calculator 124 may calculate a total loss value by summing the first loss value, the second loss value and a third loss value for a position of the answer sentence which corresponds to an output of the second encoding layer 123.

For example, the loss value calculator 124 may use a cross-entropy as a loss function, and calculate the total loss value by applying weights to each of the loss values.

The weight adjuster 125 may adjust weights of hidden layers of the machine reading comprehension model in a direction to minimize the calculated total loss value (1070). Specifically, the weight adjuster 125 may adjust weights of hidden layers of the embedding layer 121, the first encoding layer 122 and the second encoding layer 123.

According to the above-described training method, multi-task learning where word-level training and sentence-level training are performed simultaneously may be performed. That is, weights or parameters of each hidden layer reflect both word information and sentence information, and an accuracy of the machine reading comprehension model may be improved.

Figure 15:
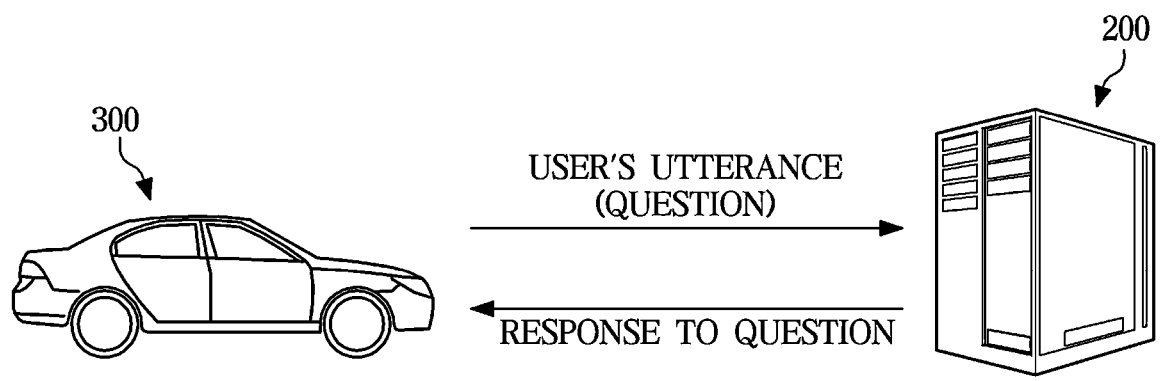
FIG. 15 is a diagram illustrating information exchanged between an electronic device and a question answering system according to an embodiment.
Figure 16:
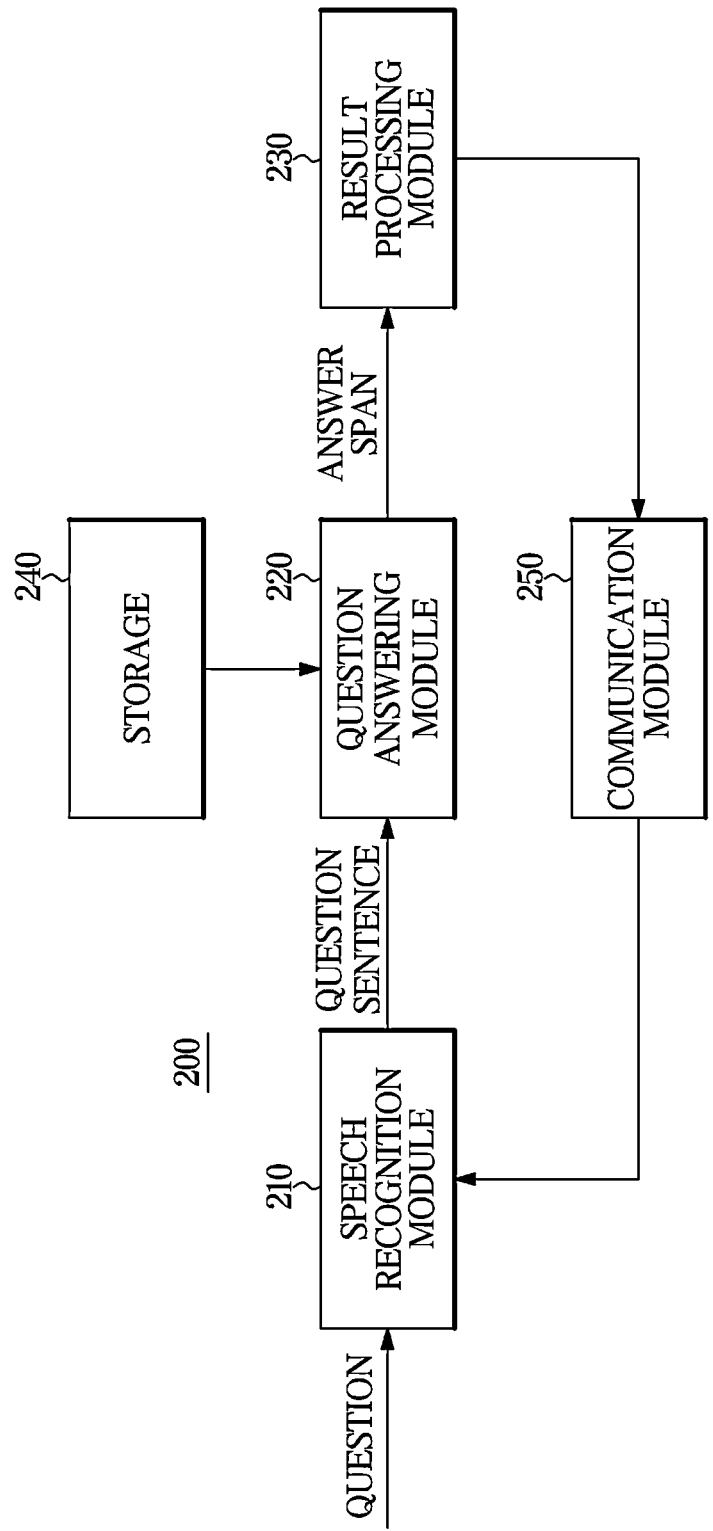
FIG. 16 is a block diagram illustrating operations of a question answering system according to an embodiment.

FIG. 15 is a diagram illustrating information exchanged between an electronic device and a question answering system according to an embodiment. FIG. 16 is a block diagram illustrating operations of a question answering system according to an embodiment.

Referring to FIG. 15, a question answering system 200 according to an embodiment may be connected to an electronic device 300 through a communication network and receive a user's utterance including a question input by a user.

Although a vehicle as the electronic device 300 is illustrated in the example, as described above, in addition to the vehicle, the electronic device 300 may be at least one of a mobile device such as a smartphone or a tablet PC, a wearable device such as a smart watch or smart glasses, an AI speaker, or home appliances.

A machine reading comprehension model trained according to the above-described embodiment may be stored in the question answering system 200, and the question answering system 200 may search for an answer span to the input question using the stored machine reading comprehension model, and transmit a response to the question to the electronic device 300 based on the retrieved answer span.

Referring to FIG. 16, the question answering system 200 according to an embodiment may include a speech recognition module 210, a question answering module 220, a result processing module 230, a storage 240 and a communication module 250.

According to an exemplary embodiment of the present disclosure, each of the speech recognition module 210, the question answering module 220, the result processing module 230, and the communication module 250 may include a processor (e.g., computer, microprocessor, CPU, ASIC, circuitry, logic circuits, etc.) and an associated non-transitory memory storing software instructions which, when executed by the processor, provides the functionalities of at least one of the modules as described here. Herein, the memory and the processor may be implemented as separate semiconductor circuits. Alternatively, the memory and the processor may be implemented as a single integrated semiconductor circuit. The processor may embody one or more processor(s).

The question answering system 200 according to an embodiment may be implemented as a server, and include at least one memory storing a program performing the operations to be described below and at least one processor implementing a stored program.

The communication module 250 may wirelessly communicate with a base station or an access point (AP), and exchange data with external devices through a base station or an access point.

For example, the communication module 250 may wirelessly communicate with an access point using Wi-Fi (Wi-Fi™, IEEE 802.11 standard), or communicate with a base station using a code division multiple access (CDMA), wideband CDMA (WCDMA), global system for mobile communication (GSM), long term evolution (LTE), 5G, Wibro, and the like.

The communication module 250 may wirelessly communicate with the electronic device 300 through the above communication method. The communication module 250 may receive a user's utterance from the electronic device 300, and transmit a system response output from the result processing module 230 to the electronic device 300.

The speech recognition module 210 may be implemented as a speech to text (STT) engine, and perform conversion into text by applying a speech recognition algorithm to a voice command.

For example, the speech recognition module 210 may extract feature vectors from a voice command by applying a feature vector extraction method such as a cepstrum, a linear predictive coefficient (LPC), a Mel frequency cepstral coefficient (MFCC), a filter bank energy, or the like.

Also, a recognition result may be obtained by comparing extracted feature vectors and trained reference patterns. To this end, an acoustic model for modeling and comparing signal characteristics of voice or a language model for modeling a linguistic order of recognition vocabulary such as words or syllables may be used.

In addition, the speech recognition module 210 may convert the voice signal into the text based on learning where deep learning or machine learning is applied. In the embodiment, a way of converting the voice command into the text by the speech recognition module 210 is not limited thereto, and a variety of speech recognition technologies may be applied to convert the user's utterance into the text.

The question answering module 220 may search for the answer span to the question sentence using the machine reading comprehension model trained according to the above-described method. To this end, the machine reading comprehension model trained according to the above-described embodiment may be stored in the memory of the question answering system 200.

Documents including manuals for a function of or how to use a specific device may be stored in the storage 240, and the question answering module 220 may search the storage 240 for a document related to the question sentence and search the searched document for a passage related to the question sentence.

The question answering module 220 may search the searched passage for the answer span to the question sentence by using the machine reading comprehension model trained according to the above-described method. A detailed process of searching for the answer span to the user's question by the question answering module 220 is described later.

The result processing module 230 generates a system response to provide the user with the answer span output from the question answering module 220. The system response may be generated in various manners. For example, a passage including the answer span to the question may be provided as text, and a phrase corresponding to the answer span may be highlighted and displayed.

Alternatively, the phrase corresponding to the answer span may be converted into a system speech using a text to speech (TTS) engine to be provided to the user.

However, the above-described methods of providing the answer span are simply an example, and embodiments of the disclosure are not limited thereto.

The communication module 250 may transmit the system response generated by the result processing module 230 to the electronic device 300.

The above-described speech recognition module 210, question answering module 220 and result processing module 230 are distinguished by an operation, and thus the modules do not necessarily use separate memories or processors.

Accordingly, two or more modules of the speech recognition module 210, the question answering module 220 or the result processing module 230 may share a memory or processor, or share a memory with the storage 240.

Figure 17:
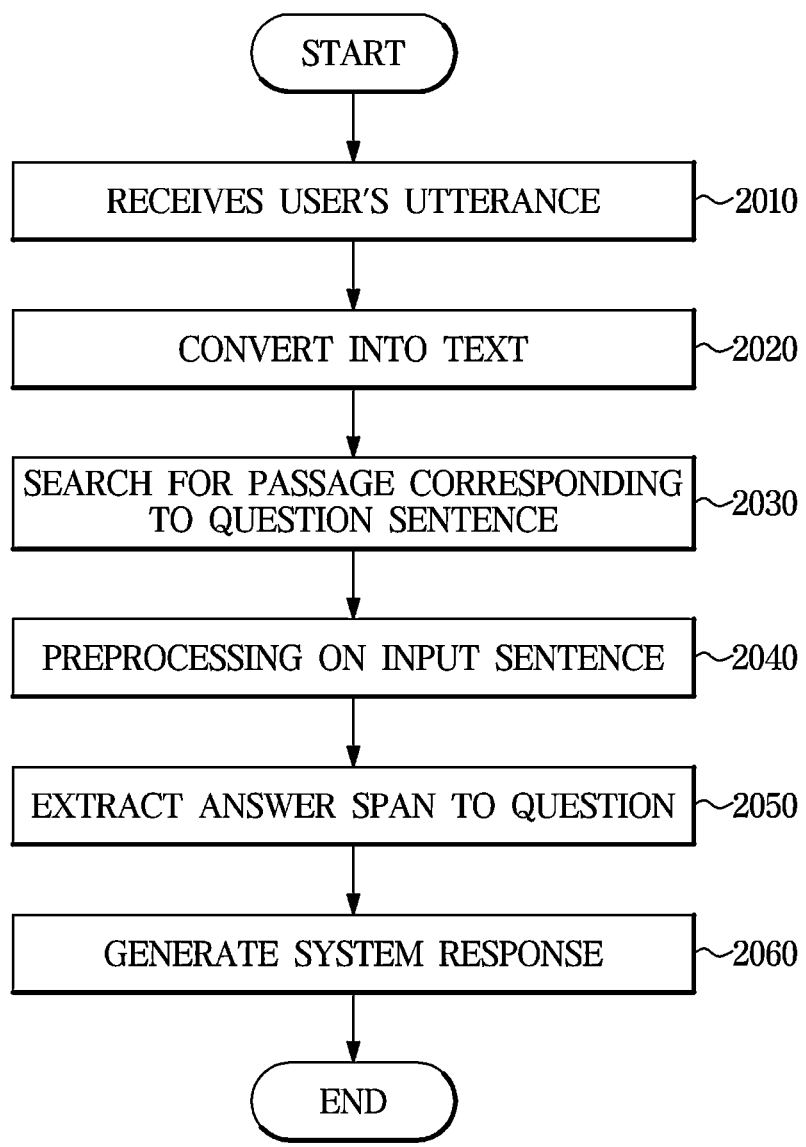
FIG. 17 is a flowchart illustrating a question answering method according to an embodiment.
Figure 18:
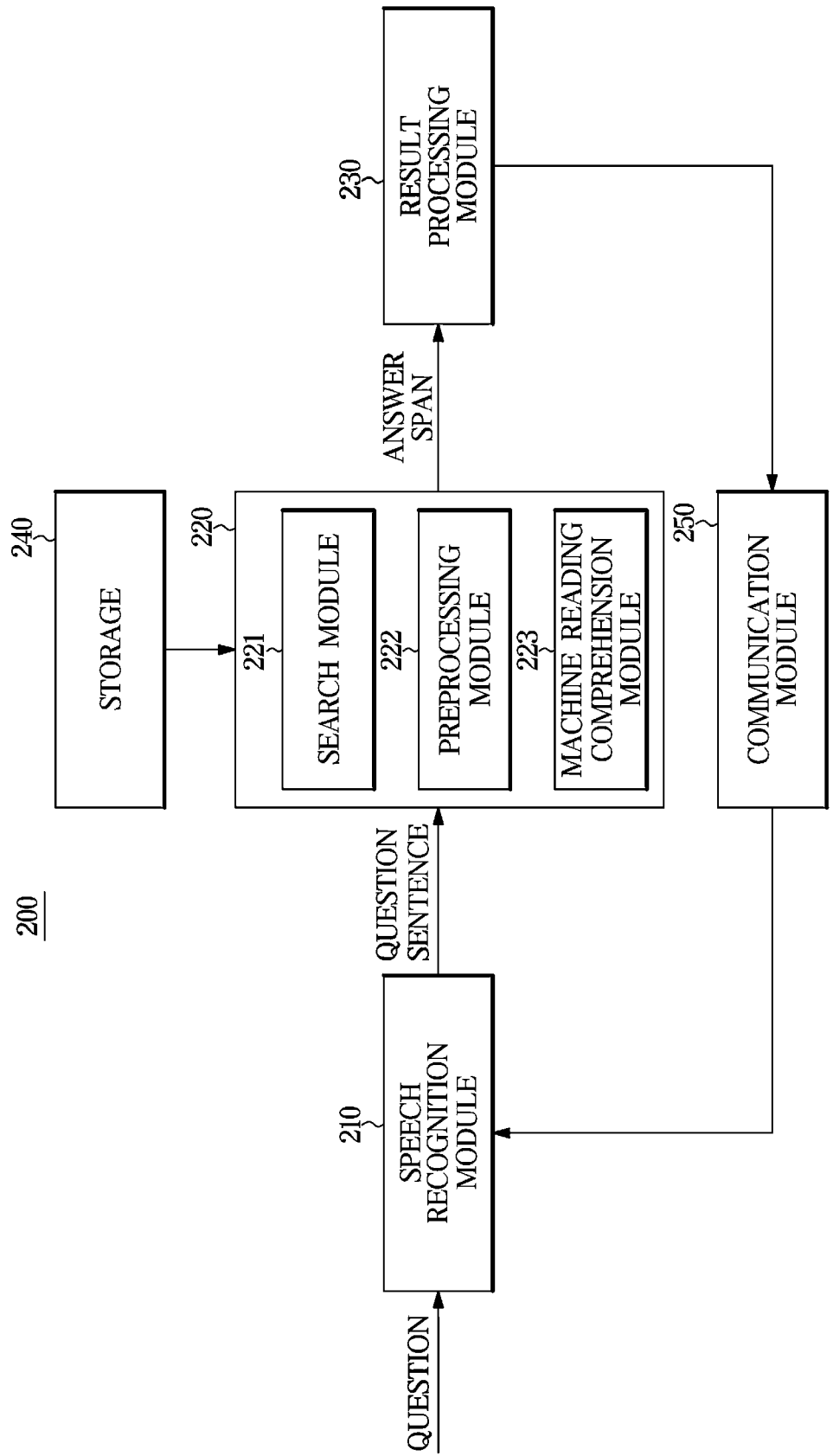
FIG. 18 is a block diagram illustrating operations of a question answering module of a question answering system according to an embodiment.

FIG. 17 is a flowchart illustrating a question answering method according to an embodiment. FIG. 18 is a block diagram illustrating operations of a question answering module of a question answering system according to an embodiment.

A question answering method according to an embodiment may be performed by the question answering system 200 described above. Accordingly, the above description on the question answering system 200 is applicable to embodiments of the question answering method, even when not specifically described below. A description on the question answering method may also be equally applied to the question answering system 200, even when not specifically described below.

Referring to FIG. 17, the communication module 250 receives a user's utterance from the electronic device 300 (2010), and the speech recognition module 210 converts the received user's utterance into text (2020).

However, when a user inputs a question as text, or when the question uttered by the user is converted into text by a speech recognition module of the electronic device 300 and is transmitted to the question answering system 200, a process for converting the user's utterance into text may be omitted.

Alternatively, a question transmitted to the question answering system 200 may be transmitted from another dialogue system, not directly transmitted from the electronic device 300. That is, the other dialogue system may request the question answering system 200 for an answer span to the user's question transmitted from the electronic device 300. In this case, the process for converting the user's utterance into text may also be omitted.

The question answering module 220 searches for a passage corresponding to the question sentence (2030).

Referring to FIG. 18, the question answering module 220 may include a search module 221 searching for a document and a passage corresponding to the question sentence. The search module 221 searches documents stored in the storage 240 for the document corresponding to the question sentence, and searches the searched documents for the passage corresponding to the question sentence.

The document corresponding to the question sentence refers to a document highly related to the question sentence, and the passage corresponding to the question sentence refers to a passage highly related to the question sentence. For example, the document and the passage corresponding to the question sentence may be retrieved based on an index word or keyword included in the question sentence.

Meanwhile, searching for the passage corresponding to the question sentence may be performed by another external system or server. In this case, the search module 221 may be omitted from the question answering system 200, and a passage search process may be omitted from the question answering method.

The question answering module 220 performs preprocessing on an input sentence (2040).

Here, the input sentence may include the question sentence, and sentences included in the passage corresponding to the question sentence. Referring to FIG. 18, the question answering module 220 may further include a preprocessing module 222. Preprocessing performed by the preprocessing module 222 is the same as that performed by the preprocessing module 110 of the training apparatus 100 described above.

Specifically, the preprocessing module 222 may separate the input sentence, normalize the input sentence, extract features from the input sentence, and convert a format of the input sentence. Here, the features extracted from the input sentence may include at least one of morpheme analysis result, POS tagging result, named-entity recognition result, category classification result, or syllable separation result.

A machine reading comprehension module 223 inputs an input sequence obtained by preprocessing to the machine reading comprehension model to extract an answer span to the question (2050).

Referring to FIG. 18, the question answering module 220 may further include the machine reading comprehension module 223. The above-described training apparatus 100 and the machine reading comprehension model (shown in FIG. 14) trained according to the training method may be stored in the machine reading comprehension module 223.

Accordingly, a process of extracting the answer span to the question by the machine reading comprehension module 223 may include the above-described operation of embedding using the pre-trained language model (1020), the operation of concatenating the features of the input sentence obtained in the preprocessing process to the output embeddings (1030), the operation of performing word-level encoding by inputting the output embeddings to which the features are concatenated to the first encoding layer 122 (1040), and the operation of performing sentence-level encoding by inputting a portion of hidden states of the first encoding layer 122 to the second encoding layer 123 (1050).

Information about a starting position and an ending position of the answer span may be obtained by the first encoding layer 122, and information about a position of an answer sentence may be obtained by the second encoding layer 123.

Alternatively, according to various embodiments, the second encoding layer 123 may be omitted, and only the information about the starting position and the ending position of the answer span may be obtained.

The result processing module 230 generates a system response to provide the user with the extracted answer span (2060).

As described above, the system response may be generated in various manners, and thus, for example, a passage including the answer span to the question may be provided as text, and a phrase corresponding to the answer span may be highlighted and displayed.

Alternatively, the phrase corresponding to the answer span may be converted into a system speech using a text to speech (TTS) engine to be provided to the user.

Meanwhile, the machine reading comprehension model may be used in a manner that the question answering system 200 requests another external system or server storing the trained machine reading comprehension model to search for an answer span, without storing the trained machine reading comprehension model directly.

In this case, the question answering module 220 may be omitted from the question answering system 200, and only a portion of the above-described operations of the question answering module 220 may be performed by the question answering module 220 and the other remaining operations may be requested to another external system or server.

Meanwhile, the method for training a machine reading comprehension model and the question answering method can be stored in the form of a recording medium storing computer-executable instructions. The instructions may be stored in the form of a program code, and when executed by a processor, the instructions may perform operations of the disclosed embodiments.

The recording medium may be implemented as a non-transitory computer-readable medium.

The computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A method for training a machine reading comprehension model, the method comprising:
   obtaining features of input sentences;
   generating an input sequence including a plurality of tokens based on at least one feature among the obtained features;
   embedding the input sequence using a pre-trained language model;
   inputting an output embedding, obtained by embedding the input sequence, to a first encoding layer to perform word-level encoding;
   inputting a portion of hidden states of the first encoding layer to a second encoding layer to perform sentence-level encoding;
   calculating a first loss value for a starting position of the answer span and a second loss value for an ending position of the answer span; and
   calculating a third loss value for a position of a sentence including the answer span.

2. The method of claim 1, wherein the input sentences include a question sentence and sentences included in a passage including an answer span to the question sentence.

3. The method of claim 2, wherein an output of the first encoding layer includes information about the starting position and the ending position of the answer span among the input sentences.

4. The method of claim 3, wherein an output of the second encoding layer includes information about the position of the sentence including the answer span among the input sentences.

5. The method of claim 1, further comprising:
   adjusting weights of the first encoding layer, the second encoding layer, and the pre-trained language model based on the first loss value, the second loss value and the third loss value.

6. The method of claim 2, wherein the embedding comprises concatenating at least one feature of the features of the input sentences to the output embedding output from the pre-trained language model.

7. The method of claim 1, wherein a hidden state for tokens distinguishing the input sentences among the hidden states of the first encoding layer is input to the second encoding layer.

8. The method of claim 6, wherein the at least one feature concatenated to the output embedding includes at least one of a category classification result or a syllable separation result of the input sentences.

9. The method of claim 1, wherein the embedding comprises generating an input embedding input to the pre-trained language model by summing a token embedding, a segment embedding and a position embedding for the input sequence.

10. A computer-readable recording medium storing a program for implementing a method for training a machine reading comprehension model, the method comprising:
generating an input sequence including a plurality of tokens based on at least one feature among features of input sentences;
embedding the input sequence using a pre-trained language model;
inputting an output embedding, obtained by embedding the input sequence, to a first encoding layer to perform word-level encoding;
inputting a portion of hidden states of the first encoding layer to a second encoding layer to perform sentence-level encoding;
calculating a first loss value for a starting position of the answer span and a second loss value for an ending position of the answer span; and
calculating a third loss value for a position of a sentence including the answer span.

11. The computer-readable recording medium of claim 10, wherein the input sentences include a question sentence and sentences included in a passage including an answer span to the question sentence.

12. The computer-readable recording medium of claim 11, wherein an output of the first encoding layer includes information about the starting position and the ending position of the answer span among the input sentences.

13. The computer-readable recording medium of claim 12, wherein an output of the second encoding layer includes information about the position of the sentence including the answer span among the input sentences.

14. The computer-readable recording medium of claim 10, further comprising:
adjusting weights of the first encoding layer, the second encoding layer, and the pre-trained language model based on the first loss value, the second loss value and the third loss value.

15. The computer-readable recording medium of claim 11, wherein the embedding comprises concatenating at least one feature of the features of the input sentences to the output embedding output from the pre-trained language model.

16. The computer-readable recording medium of claim 10, wherein a hidden state for tokens distinguishing the input sentences among the hidden states of the first encoding layer is input to the second encoding layer.

17. The computer-readable recording medium of claim 15, wherein the at least one feature concatenated to the output embedding includes at least one of a category classification result or a syllable separation result of the input sentences.

18. The computer-readable recording medium of claim 10, wherein the embedding comprises generating an input embedding input to the pre-trained language model by summing a token embedding, a segment embedding and a position embedding for the input sequence.

19. A question answering system, comprising:
a communication module configured to receive a question sentence of a user; and
a question answering module configured to search for an answer span to the question sentence using a trained machine reading comprehension model;
wherein the trained machine reading comprehension model comprises:
an embedding layer configured to embed an input sequence corresponding to the question sentence using a pre-trained language model;
a first encoding layer configured to perform word-level encoding on an output embedding obtained by embedding the input sequence;
a second encoding layer configured to perform sentence-level encoding on a portion of hidden states of the first encoding layer; and
a loss value calculator configured to calculate a first loss value for a starting position of the answer span, a second loss value for an ending position of the answer span, and a third loss value for a position of a sentence including the answer span.

20. The question answering system of claim 19, wherein the question answering module is configured to generate the input sequence by preprocessing the question sentence and input sentences including sentences of a passage related to the question sentence.

21. The question answering system of claim 20, wherein an output of the first encoding layer includes information about the starting position and the ending position of the answer span to the question sentence among the input sentences.

22. The question answering system of claim 21, wherein an output of the second encoding layer includes information about the position of the sentence including the answer span among the input sentences.

23. The question answering system of claim 20, wherein at least one feature of the features of the input sentences is concatenated to the output embedding and is input to the first encoding layer.

24. The question answering system of claim 20, wherein a hidden state for tokens distinguishing the input sentences among the hidden states of the first encoding layer is input to the second encoding layer.

25. The question answering system of claim 23, wherein the at least one feature concatenated to the output embedding includes at least one of a category classification result or a syllable separation result of the input sentences.

26. The question answering system of claim 19, wherein the question answering module is configured to generate an input embedding input to the pre-trained language model by summing a token embedding, a segment embedding and a position embedding for the input sequence.

* * * * *